Patented Feb. 8, 1944

2,341,395

UNITED STATES PATENT OFFICE 2,341,395

OIL THICKENER

Warren M. Smith, Elizabeth, and William J. Sparks, Cranford, N. J., assignors to Standard Oil Development Company, a corporation of Delaware No Drawing. Application May 9, 1939, Serial No. 272,609

8 Claims. (Cl. 252—46)

This invention relates to novel sulfurized polymers and to methods of making and using same, and more particularly to the preparation of an improved sulfurized polymer adapted to be used as an addition agent to mineral oils in the preparation of lubricants.

It is well known that lubricating oils undergo undesirable changes in viscosity with changes in temperature; they thin out (i. e. have lower viscosity) at high temperatures, and thicken (i. e. increase in viscosity) at low temperatures. The viscosity index (V. I.) is the term employed to express the relationship between viscosity change with a given change in temperature. Specifically, the V. I. indicates the relation which the viscosity of an oil at 100 degrees F. bears to the viscosities of an average Pennsylvania and an average Coastal oil at that temperature, all three oils having the same viscosity at 210° F. The perfect oil, as far as viscosity is concerned, would be one having a constant viscosity regardless of temperature, but no such oil exists. Changes in viscosity with temperature change are not the same for all oils as some thin out to a greater extent when heated and thicken to a greater extent when cooled, than others for a given temperature change. It is desirable for lubricating oil use, to produce an oil which displays a relatively small change in viscosity between the temperatures of 100° F. and 210° F., or in other words, it is advantageous for the oil to have a relatively flat viscosity-temperature curve, or a high viscosity index, as explained by Dean and Davis in Chemical and Metallurgical Engineering, volume 36, pages 618–9, October 1929.

Where it is impossible or impractical to produce sufficiently high V. I. oils by the ordinary refining methods as is the case with oils obtained from certain types of crudes, it has become the custom to resort to the method of adding certain materials known as oil thickeners to the oil base stock. The viscosity characteristics as well as the lubricating characteristics of the oil base stock are thereby materially improved. Among the various substances known to the art as oil thickeners are: rubber, hydrogenated rubber, unvulcanized rubber, and various types of organic, oil-soluble, hydrocarbon materials especially polymers of various organic compounds, e. g., polyisobutylene having a molecular weight above 1,000 and preferably above 3,000 or higher, but not all of these materials are satisfactory, for instance rubber tends to gum up and soon is thrown out of the oil solution, possibly as a result of oxidation.

One object of the present invention is to provide new and superior lubricating oil thickeners for addition to lubricating oils to improve their viscosity, viscosity-temperature and lubricating characteristics.

Another object of the invention is to prepare a sulfurized polymer product which is high in molecular weight, plastic, semi-elastic, substantially saturated in respect to hydrogen, very resistant to oxidation and attack by chemicals such as acids, alkalies and the like, and having per se utility in the form of sheeted and molded products as well as in making coated and laminated sheet material, such as paper, cloth, etc., or in making liquid coating compositions adapted to be spread or painted upon solid surfaces and permitted to evaporate to leave a relatively dry, non-tacky protective film.

Other objects of the invention will be apparent as the description proceeds.

Broadly the invention comprises treating with a sulfur halide a substantially saturated linear type polymer containing essentially carbon, hydrogen and at least one type of a non-hydrocarbon atom. More specifically, it comprises reacting with sulfur chloride a high molecular weight substantially saturated polymer of an organic compound containing certain types of polar linkages, such as compounds containing oxygen, sulfur, nitrogen, or a halogen linked directly to a carbon atom. By the expression "substantially saturated," it is intended to mean that such polymer has an iodine number less than about 20 and preferably less than 5. It is also preferred to make oil-soluble sulfurized polymers by treating with sulfur chloride an oil-soluble polymer and stopping the sulfur chloride treatment before the resultant product becomes insoluble in mineral oil. The polymers to be subjected to the sulfurizing treatment and containing carbon, hydrogen, and oxygen for example, preferably have a molecular weight between the approximate limits of 500 and 10,000, especially when it is desired to produce a mineral-oil-soluble product. Various types of polymers may be used as raw material.

For example, low molecular weight polyvinyl ethers which are oil-soluble may be condensed with sulfur monochloride, $S_2Cl_2$, to give oil-soluble sulfurized products which are useful as oil thickeners. Likewise, sulfurized products may be prepared by sulfur monochloride treatment of vinyl esters of the higher fatty acids or other analogous substances, e. g., lauryl acrylate, chloroprene-isobutylene copolymer, butadieneisobutylene copolymer reaction product with maleic anhydride, polymethallylchloride or copolymer thereof with isobutylene, etc.

Polymers of acrylic acid esters of alcohols having at least 10 carbon atoms may be used; these are desirable for producing mineral-oil-soluble products. Included in this group is the lauryl acrylate mentioned above, having the formula $C_{12}H_{25}OOC-CH=CH_2$. Although some of the acrylates of the lower alcohols, such as methyl or ethyl, have previously been reacted with sulfur in elemental form, the resultant reaction and product are entirely different from those obtained with sulfur chloride treatment, and accordingly these acrylates of the lower alcohols are considered included within the broader scope of this invention, although the oil-soluble products made from the higher alcohols are preferred. Instead of using acrylic acid in making such esters, methacrylic acid may be used and the corresponding polymers formed, e. g., from the acid or their esters. Vinyl ethers having the general formula $CH_2=CH-O-R$ may be used, in which R is a hydrocarbon radical, either alkyl, e. g., methyl, ethyl, etc., or aryl, such as phenyl. To make oil-soluble sulfurized polymers it is preferred to start with polymers of monovinyl ethers having at least 6 carbon atoms, e. g., isobutyl vinyl ether, or amyl vinyl ether, etc. Other specific examples of polymers which may be used as raw materials in this invention are allyl alcohols having the formula $$CH_2=CH-CH_2OH$$

allyl chloride $CH_2=CH-CH_2Cl$, and methallyl chloride $CH_2=C(CH_3)-CH_2Cl$.

One preferred class of polymers to be used is polymers of molecules containing oxygen and also containing a group $CH_2=CR-$, where R is either hydrogen or a lower hydrocarbon group having less than 10 carbon atoms, this hydrocarbon group being either alkyl or aryl. This class includes both the vinyl ethers and the acrylic acid esters.

This novel oil thickener may be prepared for example, by the treatment of the various organic polar linkage compounds mentioned above with sulfur monochloride in a suitable inert solvent at temperatures above room temperature for about a half-hour. Suitable solvents include carbon tetrachloride, dichlorobenzene, chlorobenzene, tetrachloroethane and the like as well as refined naphtha, benzol, etc. Mineral oil base stocks of various kinds may be used, e. g., lubricating oils, greases, and even lighter oils such as gas oils and Diesel fuels, or gasoline for motor fuel or cleaning purposes. The sulfurized product may also be used in fatty oils, e. g., paint, varnish and lacquer vehicles, e. g., linseed oil, etc.

In carrying out the sulfurization the amount of the organic material to be used may vary over a fairly wide range. The determining factors are: the molecular weight of the compound possessing the polar linkage, the amount of solvent employed, and the viscosity of the resultant solution of polar polymer therein. Generally the amount of polar compound to be used varies between the approximate limits of 1 to 20 parts, preferably 2 to 10 parts by weight for each 100 parts of solvent. The temperature may range between the approximate limits of 80° and 200° C., and preferably between 100 and 175° C. It is preferred to use sulfur monochloride as the sulfurizing agent and it is preferred to use about 2% to 50% of the sulfur monochloride in relation to the weight of solvent used, or ⅓ to 2 parts by weight for each 1 part of polymer to be treated. This amount of treating agent corresponds approximately to a ratio of 1 to 10 mols of sulfur monochloride to 1 mol of the polymer being treated; for instance, a 1:1 molar ratio is equivalent to about 2% by weight of sulfur monochloride if the polymer has a molecular weight of about 5,000. Instead of using sulfur monochloride, other sulfur halides may be used such as sulfur dichloride ($SCl_2$) or sulfur tetrachloride ($SCl_4$).

In carrying out the sulfurization process, care must be taken not to let the reaction proceed too far because upon continued reaction an oil-soluble product may be formed. In other words the reaction is carried out under such conditions that the sulfurized product formed is soluble in the type of oil to which it is to be added for use. The controlling conditions vary according to the chemical nature and viscosity of the oil, but can be determined preliminarily by testing a small sample of the reaction product at various stages of the reaction. The time of heating will depend upon the particular polar polymer being used, the proportion of solvent and sulfur monochloride, and upon the temperature, and may range from a few minutes to a number of hours, but usually one-half hour is sufficient.

The sulfurized product resulting from this treatment has greater stability to heat and to the "breakdown" action of gears operating under load, and to ultra-violet light, than the unsulfurized materials.

The amount of this novel oil thickener to be used as an addition to mineral oils for making lubricants, will depend largely upon the viscosity of the oil base stock and the thickening power of the sulfurized product, as well as upon the viscosity desired in the finished product. The amount, however, has been found to range generally between the approximate limits of 0.5 and 30%, usually 1 to 10% giving satisfactory improvement in viscosity and viscosity index, especially for lubricating oil and grease manufacture.

The following example gives a specific instance of the preparation of these new and superior sulfurized polar polymers.

*Example 1*

25 grams of polymerized lauryl acrylate are dissolved in about 450 g. of chlorobenzene; 5 grams of sulfur monochloride are added and the mixture is heated for thirty minutes at a temperature of about 150° C., just below the boiling point of the solvent (B. Pt. 160° C.). The reaction mass is then cooled and the sulfurized product is precipitated with isopropyl alcohol. The precipitated product, separated in any suitable manner, is a resinous, sulfurized, acrylic polymer containing free sulfur and other extraneous impurities. The free sulfur and extraneous impurities are removed by dissolving the polymer in a suitable solvent and filtering through sand and soda. The refined product is recovered from the solvent, dried, and if desired, is dissolved or otherwise incorporated in the oil as a V. I. improver.

The effect of the sulfurized acrylic polymer on the viscosity and viscosity index characteristics of a mineral oil base stock is shown in the following tables. For the sake of comparison, the corresponding results obtained with the unsulfurized lauryl acrylate are given.

Table 1

| Thickener | Oil used | Vis. (Saybolt sec.) | | V.I. |
|---|---|---|---|---|
| | | 100° F. | 210° F. | |
| Blank | Oil A [1] | 102 | 37.7 | 18 |
| 2% polymerized lauryl acrylate | do | 192.6 | 49.4 | 135 |
| 2% polymerized lauryl acrylate $S_2Cl_2$ treated | do | 218.8 | 53.2 | 140 |

[1] Oil A is a naphthenic petroleum distillate having the following inspection characteristics:
Gravity _____° A. P. I.. 27.9
Color (Robinson) _____ .17
Flash _____° F.. 325
Pour _____° F.. −35
Conradson carbon _____per cent.. 0.02

Table 2

| Thickener | Oil used | Vis. (Saybolt sec.) | | V.I. |
|---|---|---|---|---|
| | | 100° F. | 210° F. | |
| Blank | Oil B [1] | 155.4 | 43.3 | 96 |
| 2% lauryl acrylate | do | 255 | 56.1 | 137 |
| 2% lauryl acrylate $S_2Cl_2$ treated | do | 318.9 | 64.4 | 141 |

[1] Oil B is a solvent refined paraffinic petroleum distillate having the following inspection characteristics:
Gravity _____° A. P. I.. 31.8
Color (Robinson) _____ 17¼
Flash _____° F.. 420
Pour _____° F.. +10
Conradson carbon _____ 0.005

The sulfurized product of this invention is believed to be much more stable physically to light and heat than the original unsulfurized material and to make a more stable oil solution under conditions of heat and pressure, for instance as used with loaded gears, than does the unsulfurized material.

The sulfurized acrylic polymer has a substantially greater thickening power and confers a superior V. I. on an oil base stock than the same polymer before the sulfurization treatment as is apparent from the above tables.

Although no attempt is made to explain the mechanism of the operation of the sulfurization reaction it is believed that condensation of the polar compound occurs simultaneously with the sulfurization. The exact reactions which take place during the sulfurization are not known with certainty but chemical analyses indicate that the sulfurized product contains both a small amount of chlorine and a small amount of sulfur in combination. Products prepared as in Example 1 contained free sulfur. After removal of this with dilute NaOH solution, the product contained 1.6% $Cl_2$ and 1.1% sulfur. In spite of the low chlorine and sulfur content a substantial excess of sulfur monochloride is generally required to produce the desired sulfurization reaction.

The sulfurized products alone and in oil solution exhibit remarkably high resistance to heat and pressure conditions or so-called "extreme pressure" properties, thus making them suitable as a base for the preparation of "extreme pressure" lubricating oils and greases. They also find use in conjunction with other thickeners, oiliness agents, dyes, anti-oxidants, soaps, pour inhibitors, sludge dispersers, and other oil-addition agents generally.

*Example of grease.*—A lime soap grease, containing 15% of calcium soap, prepared in the conventional manner, and having an A. S. T. M. penetration of 240 (in tenths of 1 mm.) at 77° F. was compounded with 2% of the product obtained in Example 1, by dissolving the sulfurized polymer in mineral oil (preferably the base oil used in the preparation of the grease) and blending the oil-polymer solution with the grease by mechanical mixing. The resultant solid lubricant had a penetration of 260/280 at 77° F. This lubricant having extreme pressure properties is suitable for lubricating conditions where excessive loads are encountered and where an uncompounded lubricant would be unsuitable.

It is not intended that the invention be limited to any of the specific examples which are given merely for the sake of illustration, nor to any theories as to the operation of the invention but only by the appended claims in which it is intended to claim all novelty inherent in the invention as broadly as the prior art permits.

We claim:

1. A lubricant comprising in combination a hydrocarbon lubricant and dissolved therein a sulfur halide reaction product of a high molecular weight, substantially saturated, linear type polymer of a simple monomeric compound, composed essentially of carbon, hydrogen, and at least one kind of non-hydrocarbon atom in addition to the sulfur halide reaction material, the said solute being highly resistant to oxidation, and to acids and alkalis.

2. A lubricant comprising in combination a hydrocarbon lubricating substance, having dissolved therein a sulfur chloride reaction product of a high molecular weight, substantially saturated, linear type, mineral-oil-soluble polymer of a simple monomeric compound; the said polymer being characterized by an iodine number less than about 20, and a molecular weight within the approximate limits of from 500 to 10,000; the said polymer consisting essentially of carbon, hydrogen, and at least one kind of non-hydrocarbon atom.

3. A lubricant comprising in combination a hydrocarbon lubricating substance, having dissolved therein a sulfur chloride reaction product of a high molecular weight, substantially saturated, linear type, mineral-oil-soluble polymer of a simple monomeric compound; the said polymer being characterized by an iodine number less than about 20, and a molecular weight within the approximate limits of from 500 to 10,000; the said polymer consisting essentially of carbon, hydrogen, and at least one kind of non-hydrocarbon atom; the said non-hydrocarbon atom comprising oxygen.

4. A lubricant comprising in combination a hydrocarbon lubricating material, containing, dissolved therein, a sulfurized polymer, the said polymer being a substantially saturated, linear type polymer of a simple monomeric compound, characterized by a molecular weight within the range of from 500 to 10,000, composed of essentially carbon, hydrogen and oxygen, and containing the group $CH_2=CR-$, wherein R is either hydrogen or a hydrocarbon group containing less than 10 carbon atoms.

5. A lubricant comprising in combination a hydrocarbon lubricating substance; and dissolved therein, a sulfurized, substantially saturated, linear type simple polymer of an ester of an acid having the formula $CH_2=C(R)-COOH$, wherein R is either hydrogen or a lower hydrocarbon group containing less than 10 carbon atoms.

6. A lubricant comprising in combination a hydrocarbon lubricating substance containing dissolved therein a sulfur halide reaction product of a high molecular weight, substantially saturated, linear type polymer of an acrylic ester of an alcohol having at least 10 carbon atoms; the said polymer being characterized by a molecular weight within the range of 500 to 10,000, the sulfurized polymer being characterized by solubility in hydrocarbons.

7. The method of preparing a high grade lubricant comprising the steps of producing a high molecular weight, substantially saturated linear polymer containing hydrogen, carbon and at least one kind of an inorganic atom and formed from a simple monomeric compound and characterized by a molecular weight within the range of 500 to 10,000 by treating the polymer with sulfur monochloride in an amount between 0.2 and 2 parts by weight for each one part of the polymer and dissolving the sulfurized polymer in a hydrocarbon lubricant.

8. A lubricant comprising a mineral lubricating oil base stock containing dissolved therein a sulfurized polymer of lauryl acrylate.

WARREN M. SMITH.
WILLIAM J. SPARKS.